United States Patent
Gong et al.

(10) Patent No.: US 11,649,355 B2
(45) Date of Patent: May 16, 2023

(54) LOW-DIELECTRIC RESIN COMPOSITION, LOW-DIELECTRIC RESIN/METAL COMPOSITE MATERIAL AND PREPARATION METHOD THEREOF, AND ELECTRONIC EQUIPMENT

(71) Applicant: BYD COMPANY LIMITED, Guangdong (CN)

(72) Inventors: Qing Gong, Shenzhen (CN); Wei Zhou, Shenzhen (CN); Xiong Zhang, Shenzhen (CN); Yue Yu, Shenzhen (CN); Renlan Shi, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 728 days.

(21) Appl. No.: 16/608,649

(22) PCT Filed: Mar. 28, 2018

(86) PCT No.: PCT/CN2018/080863
§ 371 (c)(1),
(2) Date: Mar. 27, 2020

(87) PCT Pub. No.: WO2018/196539
PCT Pub. Date: Nov. 1, 2018

(65) Prior Publication Data
US 2020/0224030 A1 Jul. 16, 2020

(30) Foreign Application Priority Data
Apr. 27, 2017 (CN) .......................... 201710287274.7

(51) Int. Cl.
| | |
|---|---|
| *C08L 81/02* | (2006.01) |
| *B29C 45/14* | (2006.01) |
| *B32B 15/09* | (2006.01) |
| *C08L 67/02* | (2006.01) |
| *B29K 67/00* | (2006.01) |
| *B29K 81/00* | (2006.01) |
| *B29K 105/12* | (2006.01) |
| *B29K 309/08* | (2006.01) |

(52) U.S. Cl.
CPC ........ *C08L 81/02* (2013.01); *B29C 45/14311* (2013.01); *B32B 15/09* (2013.01); *C08L 67/02* (2013.01); *B29C 2045/14868* (2013.01); *B29K 2067/006* (2013.01); *B29K 2081/04* (2013.01); *B29K 2105/122* (2013.01); *B29K 2309/08* (2013.01); *B29K 2995/0006* (2013.01); *C08L 2203/20* (2013.01); *C08L 2205/03* (2013.01); *C08L 2205/06* (2013.01)

(58) Field of Classification Search
None
See application file for complete search history.

(56) References Cited

U.S. PATENT DOCUMENTS

| | | | |
|---|---|---|---|
| 4,041,235 A | 8/1977 | Suzuki et al. | |
| 5,444,124 A | 8/1995 | Schlund et al. | |
| 2017/0292021 A1* | 10/2017 | Zhang | C08L 67/00 |
| 2018/0265701 A1* | 9/2018 | Tomoda | C08K 3/26 |

FOREIGN PATENT DOCUMENTS

| | | | |
|---|---|---|---|
| CN | 1563188 A | | 1/2005 |
| CN | 101012105 | * | 7/2008 |
| CN | 101696089 A | | 4/2010 |
| CN | 102558863 A | | 7/2012 |
| CN | 102653630 A | | 9/2012 |
| CN | 202989439 U | | 6/2013 |
| CN | 103862748 A | | 6/2014 |
| CN | 104385507 A | | 3/2015 |
| CN | 104403314 A | | 3/2015 |
| CN | 104592757 A | | 5/2015 |
| CN | 104817831 A | | 8/2015 |
| CN | 105001638 A | | 10/2015 |
| CN | 105419277 A | | 3/2016 |
| CN | 105566909 A | | 5/2016 |
| CN | 106519594 A | | 3/2017 |
| JP | 2007217679 A | | 8/2007 |
| WO | WO 2016/101692 | * | 6/2016 |

OTHER PUBLICATIONS

Machine translation of Zeng et al. CN 101012105 (Year: 2008).*
Machine translation of Weng et al. CN 1563188 (Year: 2005).*
English Translation of International Search Report from PCT/CN2018/080863 dated Jul. 4, 2018 (2 pages).

* cited by examiner

*Primary Examiner* — Robert T Butcher
(74) *Attorney, Agent, or Firm* — Calfee Halter & Griswold LLP

(57) ABSTRACT

A resin composition comprises, based on 100% by weight of the resin composition: 45-70 wt % of a main resin, 20-45 wt % of a chopped glass fiber, 1-3 wt % of a toughening resin, 0.2-0.5 wt % of an unmodified glycidyl methacrylate, and 0-10 wt % of an auxiliaries. The main resin is selected from at least one of PBT resin and PPS resin. The chopped glass fiber has a dielectric constant of 4.0 to 4.4 at 1 MHz.

14 Claims, No Drawings

LOW-DIELECTRIC RESIN COMPOSITION, LOW-DIELECTRIC RESIN/METAL COMPOSITE MATERIAL AND PREPARATION METHOD THEREOF, AND ELECTRONIC EQUIPMENT

CROSS-REFERENCE TO RELATED APPLICATIONS

This application is a 35 U.S.C. 371 U.S. national stage application entry of PCT/CN2018/080863, filed on Mar. 28, 2018, which claims priority to and benefits of Chinese Patent Application No. 201710287274.7, entitled "LOW-DIELECTRIC RESIN COMPOSITION, LOW-DIELECTRIC RESIN/METAL COMPOSITE MATERIAL AND PREPARATION METHOD THEREOF, AND IT DEVICE" and filed with the State Intellectual Property Office of P. R. China on Apr. 27, 2017. The entire contents of the above-referenced applications are incorporated herein by reference.

FIELD

This application relates to a technical field of resin-metal composite materials, and particularly to a low-dielectric resin composition, a low-dielectric resin-metal composite material and a preparation method thereof, and an electronic device.

BACKGROUND

In the field of manufacturing parts of, for example, automobiles, household appliances, and industrial machines, it is necessary to firmly bond a metal to a resin. Nano-Molding Technology (NMT) is a technology for the integration of metals and plastics, by nano-structuring on a metal surface and makes a plastics injection molding on a nano-structured metal surface to obtain a metal-plastic integral molded product.

Glass fiber reinforced resins currently used in such nanofabrication processing techniques generally have a high dielectric constant and dielectric loss. For some specially designed electronic devices, especially mobile phones, when the nanofabrication processing technique is used to produce the antenna slot on the back shell of the mobile phone, the higher dielectric constant and dielectric loss will greatly reduce the ability of the mobile phone to receive or send signals.

In order to meet the use requirements of the back shell of an electronic device such as a mobile phone, the researchers have attempted to adjust the components of the resin composition to reduce the dielectric constant and dielectric loss of the corresponding resin material. However, the result is undesirable. Generally, a resin material that can satisfy the dielectric constant and dielectric loss has poor mechanical properties or the resin layer has poor adhesion power, and a resin material that can satisfy the mechanical properties and adhesion power has a high dielectric constant and dielectric loss.

SUMMARY

In order to overcome the disadvantages existing in the prior art, an object of the present disclosure is to provide a low-dielectric resin composition, a low-dielectric resin-metal composite material and a preparation method thereof, and an electronic device, such that the resin-metal composite material and corresponding products produced with the low-dielectric resin composition can have both relatively low dielectric constant and relatively good mechanical properties.

In order to achieve the above object, according to a first aspect of the present disclosure, a low-dielectric resin composition is provided, which includes, based on 100% by weight of the resin composition, 45-70 wt % of a main resin, 20-45 wt % of a chopped glass fiber, 1-3 wt % of a toughening resin, 0.2-0.5 wt % of an unmodified glycidyl methacrylate, and 0-10 wt % of an auxiliaries. The main resin is selected from at least one of PBT resin and PPS resin. The chopped glass fiber has a dielectric constant of 4.0 to 4.4 at an electromagnetic wave signal of 1 MHz.

According to a second aspect of the present disclosure, a low-dielectric resin-metal composite material is provided, which includes a low-dielectric resin material layer and a metal material layer, where the low-dielectric resin material layer is prepared with the low-dielectric resin composition according to the present disclosure.

According to a third aspect of the present disclosure, a method for preparing a low-dielectric resin-metal composite material is provided, which includes: 51: providing a metal material, and pre-treating a surface of the metal material to form nano-pores; S2: providing a low-dielectric resin composition according to the present disclosure, mixing and melting the raw materials in the low-dielectric resin composition to form a low-dielectric resin mixture, and attaching the low-dielectric resin mixture to the surface of the metal material on which nano-pores are formed, to obtain a low-dielectric resin/metal composite material after integral injection molding.

According to a fourth aspect of the present disclosure, an electronic device is provided, which includes a shell prepared from the low-dielectric resin-metal composite material according to the present disclosure; or is fabricated through the fabrication method of the present disclosure; in some embodiments of this disclosure, the electronic device is a mobile phone.

According to the low-dielectric resin composition, the low-dielectric resin-metal composite material and preparation method thereof, and the electronic device of the present disclosure, specific proportions of chopped glass fiber and unmodified glycidyl methacrylate are mixed in the base resin, such that the resin material can retain good mechanical properties and superior adhesion power while the dielectric constant and dielectric loss of the resin material are improved.

Moreover, with the same base resin component, the dielectric constant and dielectric loss of the low-dielectric resin-metal composite material prepared with the low-dielectric resin composition of the present disclosure are significantly reduced, which is advantageous for satisfying the requirements of use of plastics for antenna channels in metal shell of an electronic device, so as to improve the ability of an electronic device having antennas to receive and transmit signals.

DETAILED DESCRIPTION

Endpoints of all ranges and all values disclosed herein are not limited to the precise ranges or values, and these ranges or values should be understood as including values close to these ranges or values. For value ranges, endpoint values of the ranges, the endpoint values of the ranges and separate point values, and the separate point values can be combined with each other to obtain one or more new value ranges.

These value ranges should be construed as being specifically disclosed in this specification.

In view of the problem pointed out in the background that the dielectric constant and dielectric loss of the existing resin-metal composite are difficult to trade off with the mechanical properties and adhesion power, a low-dielectric resin composition is provided in the present disclosure, which based on 100% by weight of the resin composition, the resin composition including 45-70 wt % of a base resin, 20-45 wt % of a chopped glass fiber, 1-3 wt % of a toughening resin, 0.2-0.5 wt % of an unmodified glycidyl methacrylate, and 0-10 wt % of an auxiliaries. The base resin is selected from at least one of PBT resin and PPS resin. At room temperature, the chopped glass fiber has a dielectric constant of 4.0 to 4.4 at an electromagnetic wave signal of 1 MHz.

The inventors of this disclosure found that pure unmodified glycidyl methacrylate can better reduce the dielectric constant and dielectric loss of the resin material and increase the material rigidity at a low content than modified glycidyl methacrylate. In the present disclosure, by mixing the chopped glass fiber and the unmodified glycidyl methacrylate at a specific ratio in the main resin, the resin material can retain good mechanical properties and superior adhesion power while the dielectric constant and dielectric loss of the resin material are improved.

According to the resin composition of the present disclosure, the addition of a toughening resin not only produces a plasticization effect, but also preferably increases the compatibility between the host resin, the chopped glass fiber, the auxiliaries agent, and optionally other materials, thereby optimizing the processability of the resin composition provided in the present disclosure. Preferably, the toughening resin is one or more selected from the group consisting of ethylene-glycidyl methacrylate copolymers (preferably with a glycidyl methacrylate content of 5 to 20 wt %), ethylene-methyl acrylate-glycidyl methacrylate tercopolymers (preferably with a glycidyl methacrylate content of 5 to 10 wt %), and maleic anhydride grafted polyolefin resins.

In the present disclosure, the ethylene-glycidyl methacrylate copolymers may include BF-2C (with a glycidyl methacrylate content of 6 wt %) which would be purchased from Sumitomo Chemical Co., Ltd.; The ethylene-methyl acrylate-glycidyl methacrylate tercopolymers may include AX8900 (with a glycidyl methacrylate content of 8 wt %) which would be purchased from Arkema or BL-7M (with a glycidyl methacrylate content of 6 wt %) or be purchased from Sumitomo Chemical Co., Ltd.; the maleic anhydride grafted polyolefin resins may include, GR216 (with a graft ratio of 0.5 to 1%) which would be purchased from the Dow Chemical Company.

The inventors of this disclosure also found that adding both a chopped glass fiber and a polytetrafluoroethylene powder to the main resin can better reduce the dielectric constant and dielectric loss of the prepared resin material. In some embodiments, the resin composition further includes a polytetrafluoroethylene powder, and the resin composition includes, based on 100% by weight of the resin composition, 45-58 wt % of the base resin, 20-40 wt % of the chopped glass fiber, 10-20 wt % of the polytetrafluoroethylene powder, 1-3 wt % of the toughening resin, 0.2-0.5 wt % of the unmodified glycidyl methacrylate, and 0-10 wt % of the auxiliaries.

According to the resin composition of the present disclosure, the polytetrafluoroethylene powder has a relatively high melting point, and when the resin composition is mixed and melted, it is mixed in the form of a powder in the resin mixture. A polytetrafluoroethylene powder with a smaller particle diameter is used to ensure the fluidity of the resin mixture without affecting the adhesion of the resin/metal composite. Preferably, the polytetrafluoroethylene has a number-average molecular weight of 300,000 to 6,000,000. In some embodiments, the polytetrafluoroethylene powder has an average particle diameter of 1 to 20 μm. In some embodiments, the polytetrafluoroethylene powder has an average particle diameter of 5 to 10 μm.

According to the resin composition of the present disclosure, in order to further optimize the processability of the resin composition, the sum of the weights of the chopped glass fiber and the polytetrafluoroethylene powder is preferably 40-50 wt % of the total weight of the resin composition.

According to the resin composition of the present disclosure, preferably the chopped glass fiber includes silica, boron trioxide, and alumina. Based on 100% by the total weight of the chopped glass fiber, the content of silica is 50 to 75 wt %, the content of boron trioxide is 10 to 30 wt %, the content of alumina is 5 to 20 wt %, and the content of calcium oxide is 0 to 10 wt %. By adjusting the contents of the main components silica, boron trioxide, alumina, and optionally calcium oxide in the chopped glass fiber retains, the mechanical properties of the chopped glass fiber is retained while the dielectric constant is reduced, whereby the dielectric constant of the resin material in which the chopped glass fiber is dispersed is reduced.

According to the resin composition of the present disclosure, in some embodiments, the chopped glass fiber includes an alkali-free chopped glass fiber. Based on 100% by the total weight of the chopped glass fiber, the content of the alkali metal oxide in the chopped glass fiber is preferably less than 2 wt %. In some embodiments, the content of the alkali metal oxide in the chopped glass fiber is less than 1 wt %. The alkali metal oxide selected from at least one of $Na_2O$, $K_2O$ and $Li_2O$. In such a method, by optimizing the content of the alkali metal oxide in the chopped glass fiber, it is advantageous to enhance the electrical insulation of the glass fiber, thereby achieving a low dielectricity.

According to the resin composition of the present disclosure, in some embodiments, a chopped glass fiber includes HL series glass fibers would be purchased from Chongqing International Composite Materials Co., Ltd., and S-2 series glass fibers would be purchased from AGY Technology Co., Ltd.

According to the resin composition of the present disclosure, in order to balance the mechanical properties and processability of the prepared resin-metal composite, in some embodiments, the chopped glass fiber has a diameter of 10-15 μm, in some embodiments, the chopped glass fiber preferably has a diameter of 12-14 μm, in some embodiments, the chopped glass fiber preferably has a length of 2-6 mm, in some embodiments, the chopped glass fiber preferably has a length of 3-4 mm.

According to the resin composition of the present disclosure, there are no special requirements for the use of auxiliaries, it can be added reasonably according to the requirements of use or production of the resin material, including, in some embodiments, the auxiliaries may be selected from at least one of an antioxidant, a coupling agent and a fluidity modifier. These auxiliaries can be reasonably added according to actual needs, and will not be elaborated here again.

Also, a low-dielectric resin/metal composite material is provided in the present disclosure, which includes a low-dielectric resin material layer and a metal material layer, where the low-dielectric resin material layer is prepared with the resin composition according to the present disclosure. The low-dielectric resin-metal composite material has relatively good mechanical properties and adhesion power, and also low dielectric constant and dielectric loss.

In addition, the present disclosure also provides a method for preparing a low-dielectric resin-metal composite material. The preparation method comprises: S1: providing a metal material, and pre-treating a surface of the metal material to form nano-pores; and S2: providing a low-dielectric resin composition according to the present disclosure, mixing and melting the raw materials in the low-dielectric resin composition to form a low-dielectric resin mixture, and attaching the low-dielectric resin mixture to the surface of the metal material on which nano-pores are formed, to obtain a low-dielectric resin-metal composite material after integral injection molding.

In the present disclosure, the mechanism of metal-resin integral molding is: forming nano-pores on a metal surface, then melting the resin composition on the metal surface to allow some of the melted resin composition to infiltrate into the nano-pores, and then making the metal and the resin composition into a unibody structure by integral injection molding.

According to the preparation method of the present disclosure, in some embodiments, the step of pre-treating the surface of the metal material in S1 comprises: anodizing the surface of the metal material in the presence of an acidic etching solution. The anodizing step herein may be carried out by an anodizing technique conventionally used in the art, and the anodizing apparatus used may be any known anodizing apparatus such as an anodizing bath. Preferably, the anodizing condition comprises: electrolyzing the metal material at a temperature of 10 to 30° C. and a voltage of 10 to 100 V for 1 to 40 min with 10 to 30 wt % sulfuric acid as an acidic etching solution.

With the anodizing method mentioned in the present disclosure, an oxide film layer containing nano-pores can be formed on a surface of a metal material, and nano-pores can be formed on an oxide film layer. In some embodiments, a thickness of the oxide film layer is 1 to 10 μm; in some embodiments, a thickness of the oxide film layer is 1 to 5 In some embodiments, a pore diameter of the nano-pores formed is 10 to 100 nm; in some embodiments, a pore diameter of the nano-pores formed is 20 to 80 nm, in some embodiments, a pore diameter of the nano-pores formed is 20 to 60 nm. In some embodiments, a pore depth of the nano-pores is 0.5 to 9.5 in some embodiments, a pore depth of the nano-pores is 0.5 to 5 The use of such an anodizing process is advantageous for optimizing the depth of the nano-pores, and increasing the degree of filling of the melted resin composition to the nano-pores, thereby improving the bonding force between the resin material and the metal layer.

According to the preparation method of the present disclosure, in some embodiments, after an anodizing treatment in the pretreatment step of S1, the method further comprises immersing the anodized metal material in an alkaline etching solution. Immersing the anodized metal material in an alkaline etching solution allows for further corrosion to the surface of the metal material to form corrosion holes, which can be formed from further corrosion in the nano-pores. The double-layer three-dimensional pore structures formed by the communication of the corrosion holes with the nano-pores is advantageous to further provide the permeability of the resin composition, and improve the bonding property of the resin composition to the metal, and further facilitates the molding. In some embodiments, the pore diameter of the corrosion hole is 200-2000 nm; in some embodiments, the pore diameter of the corrosion hole is 200-1000 nm; in some embodiments, the pore diameter of the corrosion hole is 400-1000 nm; in some embodiments, the corrosion hole has a pore depth of 0.5 to 9.5 μm, and in some embodiments, the corrosion hole has a pore depth of 0.5 to 5 μm.

According to the preparation method of the present disclosure, in some embodiments, in the step of immersing the anodized metal material in an alkaline etching solution, the pH of the alkaline etching solution is 10-13. In some embodiments, in the step of immersing, the anodized metal material is alternately immersed with the alkaline etching solution and clean water, where the number of times of alternate immersion is 2 to 10 times, and the time of each immersion is 1 to 60 min.

According to the preparation method of the present disclosure, in some embodiments, in the step of immersing the anodized metal material with an alkaline etching solution, the alkaline etching solution an alkaline solution of one component or an alkaline solution of composite components. The alkaline solution of one component may be selected from an aqueous solution of $Na_2CO_3$, $NaHCO_3$ or NaOH, in some embodiments, an alkaline solution of one component has a solid content of 0.1 to 15 wt %. The use of an alkaline solution of one component enables the corrosion holes to be uniformly distributed on the surface of the oxide film layer and to have a uniform pore diameter, and makes the resin layer better bond to the metal substrate and then having better tensile strength, such that the resin and metal can be well integrated. The alkaline solution of composite components may be a mixed solution of soluble hydrogen phosphate and a soluble base, for example, an aqueous solution of $NaH_2PO_4$ and NaOH, where the solid content of the aqueous solution of $NaH_2PO_4$ and NaOH may be 0.1-15 wt %.

According to the preparation method of the present disclosure, in the step of mixing and melting the raw materials in the low-dielectric resin composition onto the surface of the metal material on which nano-pores are formed to obtain a low-dielectric resin-metal composite material after integral injection molding in S2, the melting temperature of the resin and the temperature, pressure and time of the injection molding can be reasonably selected according to the properties of the components in the resin composition.

According to the preparation method of the present disclosure, the metal material is not particularly limited, may be various metals which are common in the prior art, and may be appropriately selected depending on the field of application thereof. For example, the metal material is selected from the group consisting of aluminum, stainless steel or magnesium./*

The present disclosure also provides a low-dielectric resin-metal composite prepared by the method according to the present disclosure.

Further, the present disclosure also provides an electronic device comprising a shell produced with the low-dielectric resin-metal composite material according to the present disclosure, or by the method according to the present disclosure. In some embodiments, the electronic device is a mobile phone. The electronic device provided in the present disclosure has a suitable ability to receive and transmit signals on the basis of having an aesthetically pleasing resin/metal composite shell (for example, a back shell of a mobile phone).

The present disclosure will be further described in detail below by way of examples and comparative examples.

Resin compositions in Examples 1 to 6 and Comparative Examples 1 to 4: The sources of components are shown below, and the contents are shown in Table 1.

PBT resin: PBT1100 purchased from Changchun Chemical Company;

PPS resin: PPS1350 purchased from Zhejiang Xinhecheng Special Materials Co., Ltd.;

HL chopped glass fiber: HL series chopped glass fibers purchased from Chongqing International Composite Materials Co., Ltd., having a diameter of 13±4 μm, a length of 2-6 mm, and a dielectric constant of 4.1 at an electromagnetic wave signal of 1 MHz at room temperature. Based on 100% by the total weight of the chopped glass fiber, the content of silica is 50-60 wt %, the content of boron trioxide is 20-25 wt %, the content of calcium oxide is 0-5 wt %, the content of alumina is 10-20 wt %, and the total content of $Na_2O$, $K_2O$ and $Li_2O$ is 0-2 wt %.

S-2 chopped glass fiber: S-2 series chopped glass fibers purchased from the AGY Technology Co., Ltd., having a diameter of 13±4 μm, a length of 2-6 mm, and a dielectric constant of 4.2 at 1 MHz. Based on 100% by the total weight of the chopped glass fiber, the content of silica is 52-60 wt %, the content of boron trioxide is 20-30 wt %, the content of alumina is 10-18 wt %, the content of calcium oxide is 4-8 wt %, and the total content of $Na_2O$, $K_2O$ and $Li_2O$ is 0-1 wt %.

E chopped glass fiber: Chopped glass fiber under the trade name 534 A purchased from Jushi Group Co., Ltd., having a diameter of 13±4 μm, a length of 4-5 mm, and a dielectric constant of 6.8-7.1 at an electromagnetic wave signal of 1 MHz at room temperature. Based on 100% by the total weight of the chopped glass fiber, the content of silica is 50-60 wt %, the content of boron trioxide is 0-10 wt %, the content of alumina is 10-15 wt %, the content of calcium oxide is 15-25 wt %, and the total content of $Na_2O$, $K_2O$ and $Li_2O$ is 0-2 wt %.

Polytetrafluoroethylene powder: NF-360 purchased from Dongwan Qusheng Chemical Co., Ltd., having a number average molecular weight of 400,000, and a particle size D50 of 15 μm.

Unmodified glycidyl methacrylate (GMA): Type P1901 product purchased from Mitsubishi Rayon Co., Ltd.

Ethylene-methyl acrylate-glycidyl methacrylate tercopolymer (toughening resin): AX8900 purchased from Axma Corporation.

Method for Preparing Resin-Metal Composite in Examples 1 to 6 and Comparative Examples 1 to 4:

(1) An A5052 aluminum alloy sheet with a thickness of 1 mm was cut into a rectangular piece of 18 mm×45 mm, and then immersed in a 40 g/L NaOH aqueous solution at a temperature of 40° C. After 1 min, the sheet was washed with water and dried to obtain a pretreated aluminum alloy sheet.

(2) The aluminum alloy sheet, as an anode, was placed in an anodizing bath with 20 wt % sulfuric acid as an etching solution, electrolyzed at 25V and 15 C for 15 min, and then blow dried. The section of the surface treated aluminum alloy sheet was observed under a metallographic microscope, and determined to have a 4.5 pm-thick alumina film layer on the surface of the aluminum alloy sheet after electrolysis. The surface of the anodized aluminum alloy sheet was observed under an electron microscope to find that nano-pores having a pore size of 30-60 nm and a pore depth of 1.5 μm are present in the alumina film layer.

(3) 500 ml of 10 wt % sodium carbonate (pH=12) was prepared in a beaker at 20° C., in which the aluminum alloy sheet after the step (2) was immersed for 8 min. Then the aluminum alloy sheet was removed and placed in a beaker containing water for 1 min. This process was repeated 5 times. After the last water immersion, the aluminum alloy sheet was taken out and dried. The surface of the aluminum alloy sheet treated by the step (3) was observed under an electron microscope, to find that the surface of the aluminum alloy sheet after immersion has corrosion holes with a hole diameter of 400-900 nm and a hole depth of 4 μm.

(4) The raw material components were weighed according to the weight content in Table 1, mixed, extruded, then added to an injection molding machine, melted at 270° C. and applied on the surface of the aluminum alloy sheet after the treatment of the step (3). The resin and the aluminum alloy were integrally molded (at 270° C., under 70 MPa, for 15 s) to obtain a resin/metal composite designated respectively as S1-S6 and D1-D4.

Test:

The melted resin mixture, the resin masterbatch and the resin metal composite prepared in Examples 1 to 6 and Comparative Examples 1 to 4 were tested as follows:

(1) Notched impact strength: The test was carried out following ASTMD256-2010 Test method for determining the Izod pendulum impact resistance of plastics, where the determination temperature was 23° C. The test results are as shown in Table 2.

(2) Tensile strength: The test was carried out following ASTM D638-2014 Test method for tensile properties of plastics, where the tensile speed was 50 mm/min. The test results are as shown in Table 2.

(3) Bending strength and flexural modulus: The test was carried out following ASTM D790-2003 Standard test method for flexural properties of unreinforced and rein-

TABLE 1

| | No. | | | | | | | | | |
|---|---|---|---|---|---|---|---|---|---|---|
| | Example | | | | | | Comparative Example | | | |
| | 1 | 2 | 3 | 4 | 5 | 6 | 1 | 2 | 3 | 4 |
| PBT resin (wt %) | 47.5 | 47.8 | 57.5 | 57.5 | — | — | 55 | 55 | 57.5 | — |
| PPS resin (wt %) | — | — | — | — | 56.6 | 56.6 | — | — | — | 70 |
| HL glass fiber (wt %) | 40 | 30 | 20 | 40 | 20 | 40 | — | — | 40 | — |
| E glass fiber (wt %) | — | — | — | — | — | — | 40 | 20 | — | 25 |
| Poly tetrafluoroethylene (wt %) | 10 | 20 | 20 | — | 20 | — | — | 20 | — | — |
| GMA (wt %) | 0.5 | 0.2 | 0.5 | 0.5 | 0.4 | 0.4 | — | — | — | — |
| Toughening resin (wt %) | 2 | 2 | 2 | 2 | 3 | 3 | 5 | 5 | 2 | 5 | forced plastics and electrical insulating materials, where the bending speed is 2 mm/min. The test results are as shown in Table 2.

(4) Dielectric constant and dielectric loss: The test was carried out following ASTM D2520-2013 Standard test methods for complex dielectric constant of solid electrical insulating materials at microwave frequencies and temperatures to 1650° C. The same resin materials as those in the resin/metal composite prepared in Examples 1-6 and Comparative Examples 1~4 were tested as a sample, where the test frequency was 2 GHz. The test results are as shown in Table 2.

(5) Pull-off adhesion: The test was carried out following the tensile test method in ASTM D638-2014. The samples to be tested were prepared with the same raw materials and the same method as those in Examples 1-6 and Comparative Examples 1-4 and amenable to a tensile test on a universal material tester, where the resin in the sample to be tested is locally bonded to the aluminum alloy (with a bonded area of 50 mm$^2$), and a free end of the resin material and a free end of the aluminum alloy are retained along the same side of the test sample. The specific test method was to fix the free end of the resin material and the free end of the aluminum alloy in the sample to be tested by using the universal material tester for tensile test. The maximum load in the test results was the corresponding pull-out adhesion. The test results are as shown in Table 2.

TABLE 2

| | No. | | | | | | | | | |
|---|---|---|---|---|---|---|---|---|---|---|
| | Example | | | | | | Comparative Example | | | |
| | 1 | 2 | 3 | 4 | 5 | 6 | 1 | 2 | 3 | 4 |
| Impact strength (J/m) | 120 | 120 | 100 | 125 | 200 | 200 | 125 | 100 | 125 | 200 |
| Tensile strength (MPa) | 120 | 115 | 100 | 120 | 110 | 110 | 120 | 100 | 120 | 110 |
| Bending strength (MPa) | 200 | 190 | 160 | 205 | 160 | 170 | 200 | 156 | 200 | 170 |
| Flexural modulus (10$^3$ MPa) | 9.5 | 8.5 | 6 | 10.5 | 6.5 | 7 | 9 | 5.8 | 9.5 | 7 |
| Dielectric constant (2 GHz) | 2.95 | 3.05 | 3.10 | 3.15 | 3.25 | 3.35 | 3.65 | 3.55 | 3.21 | 3.75 |
| Dielectric loss (2 GHz, 10$^{-3}$) | 6 | 7 | 7 | 7 | 6 | 6 | 9 | 8 | 8 | 8 |
| Pull-off adhesion to aluminum alloy (MPa) | 38 | 36 | 25 | 40 | 40 | 40 | 40 | 25 | 40 | 40 |

As can be seen from Table 2, the resin/metal composite prepared according to Examples 1 to 4 of the present disclosure substantially maintains the mechanical properties and adhesion as compared with Comparative Examples 1 to 3 which also use the PBT resin as the base resin, and even desirably a lower dielectric constant and dielectric loss are obtained.

As can be seen from Table 2, the resin/metal composite prepared according to Examples 5 to 6 of the present disclosure substantially maintains the mechanical properties and adhesion as compared with Comparative Example 4 which also uses the PPS resin as the base resin, and even desirably a lower dielectric constant and dielectric loss are obtained.

The preferred embodiments of the present disclosure have been described in detail above, but the present disclosure is not limited thereto. Within the scope of the technical idea of the present disclosure, various simple modifications can be made to the technical solutions of the present disclosure, including combination of various technical features in any other suitable manner, and these simple variations and combinations should also be regarded as the disclosure of the present disclosure, and fall within the scope of protection of the present disclosure.

What is claimed is:

1. A low-dielectric resin composition, wherein based on 100% by weight of the resin composition, the resin composition comprises 45-70 wt % of a main resin, 20-45 wt % of a chopped glass fiber, 1-3 wt % of a toughening resin, 0.2-0.5 wt % of an unmodified glycidyl methacrylate, and 0-10 wt % of an auxiliaries, wherein the main resin is selected from at least one of polybutylene terephthalate (PBT) resin and polyphenylene sulfide (PPS) resin, the chopped glass fiber has a dielectric constant of 4.0 to 4.4 at an electromagnetic wave signal of 1 MHz, and the toughening resin is selected from at least one of ethylene-glycidyl methacrylate copolymers, ethylene-methyl acrylate-glycidyl methacrylate tercopolymers, and maleic anhydride grafted polyolefin resins.

2. The resin composition according to claim 1, further comprising a polytetrafluoroethylene powder, and based on 100% by weight of the resin composition, the resin composition comprises 45-58 wt % of the base resin, 20-40 wt % of the chopped glass fiber, 10-20 wt % of the polytetrafluoroethylene powder, 1-3 wt % of the toughening resin, 0.2-0.5 wt % of the unmodified glycidyl methacrylate, and 0-10 wt % of the auxiliaries.

3. The resin composition according to claim 2, wherein a sum of weights of the chopped glass fiber and the polytetrafluoroethylene powder is 40-50 wt % by a total weight of the resin composition.

4. The resin composition according to claim 2, wherein the polytetrafluoroethylene powder has a particle diameter D50 of 1 μm-20 μm.

5. The resin composition according to claim 1, wherein the chopped glass fiber comprises silica, boron trioxide, alumina, and calcium oxide; and based on 100% by a total weight of the chopped glass fiber, a content of silica is 50 to 75 wt %, a content of boron trioxide is 10 to 30 wt %, a content of alumina is 5 to 20 wt %, and a content of calcium oxide is 0 to 10 wt %.

6. The resin composition according to claim 1, wherein the chopped glass fiber is an alkali-free chopped glass fiber; based on 100% by a total weight of the chopped glass fiber, a content of the alkali metal oxide in the chopped glass fiber is less than 2 wt %; and the alkali metal oxide is one or more of $Na_2O$, $K_2O$ and $Li_2O$.

7. The resin composition according to claim 1, wherein the chopped glass fiber has a diameter of 9-17 μm and a length of 2-6 mm.

8. A low-dielectric resin/metal composite material, comprising a low-dielectric resin material layer and a metal material layer, wherein the low-dielectric resin material layer is prepared with the resin composition according to claim 1.

9. A method for preparing a low-dielectric resin/metal composite material, comprising:

providing a metal material, and pre-treating a surface of the metal material to form nano-pores; and providing a low-dielectric resin composition according to claim 1, mixing and melting the raw materials in the low-dielectric resin composition to form a low-dielectric resin mixture, and attaching the low-dielectric resin mixture to the surface of the metal material on which nano-pores are formed, to obtain a low-dielectric resin-metal composite material after integral injection molding.

10. The preparation method according to claim 9, wherein the step of pre-treating the surface of the metal material comprises: anodizing the surface of the metal material in the presence of an acidic etching solution, in which the anodizing condition comprises: electrolyzing the metal material at a temperature of 10 to 30° C. and a voltage of 10 to 100 V for 1 to 40 min with 10 to 30 wt % sulfuric acid as an acidic etching solution.

11. The preparation method according to claim 9, further comprising after the anodizing treatment in the pretreatment step: immersing the anodized metal material in an alkaline etching solution, wherein the pH of the alkaline etching solution is 10-13; and in the step of immersing, the anodized metal material is alternately immersed with the alkaline etching solution and clean water, in which the number of times of alternate immersion is 2 to 10 times, and the time of each immersion is 1 to 60 min.

12. An electronic device, comprising a shell produced with the low-dielectric resin/metal composite material according to claim 8.

13. The resin composition according to claim 2, wherein the polytetrafluoroethylene powder has a particle diameter D50 of 5 μm-12 μm.

14. The resin composition according to claim 1, wherein the chopped glass fiber is an alkali-free chopped glass fiber; based on 100% by a total weight of the chopped glass fiber, a content of the alkali metal oxide in the chopped glass fiber is less than 1 wt %; and the alkali metal oxide is one or more of $Na_2O$, $K_2O$ and $Li_2O$.

* * * * *